United States Patent [19]
Murray et al.

[11] Patent Number: 5,634,694
[45] Date of Patent: Jun. 3, 1997

[54] WHEEL ASSEMBLY AND ELASTOMERIC GUARD MEMBER

[75] Inventors: Scott L. Murray, East Lansing, Mich.; Paul N. Skotynsky, Oregon; James E. Muir, Swanton, both of Ohio

[73] Assignee: Uretech International, Inc., Luckey, Ohio

[21] Appl. No.: 645,210

[22] Filed: May 13, 1996

Related U.S. Application Data

[63] Continuation-in-part of Ser. No. 45,451, Oct. 19, 1995.
[51] Int. Cl.$^6$ ............................................. B60B 7/00
[52] U.S. Cl. ........................... 301/63.1; 301/37.1; 301/95
[58] Field of Search ..................... 301/37.1, 37.32, 301/37.33, 37.42, 37.43, 63.1, 65, 95

[56] References Cited

U.S. PATENT DOCUMENTS

| | | | |
|---|---|---|---|
| 2,736,610 | 2/1956 | Waite | 301/37.42 |
| 3,671,076 | 6/1972 | Aske, Jr. | 301/37.42 |
| 4,976,497 | 12/1990 | Post et al. | 301/37.1 |
| 5,128,085 | 7/1992 | Post et al. | 264/254 |
| 5,435,632 | 7/1995 | Gajor et al. | 301/63.1 |

FOREIGN PATENT DOCUMENTS

| | | | |
|---|---|---|---|
| 2457907 | 9/1978 | Germany | 301/37.43 |
| 3632063 | 3/1988 | Germany | 301/95 |

Primary Examiner—Russell D. Stormer
Attorney, Agent, or Firm—Emch, Schaffer, Schaub & Porcello

[57] ABSTRACT

An elastomeric guard member for use with a vehicle wheel is disclosed. The wheel includes a wheel disc and rim. The wheel disc defines a plurality of circumferential openings. In prior art wheel assemblies, debris was apparent at the wheel openings. The elastomeric guard member is positioned in a circular configuration within the space to retard water and debris from entering the space and to present a better visual appearance.

10 Claims, 5 Drawing Sheets

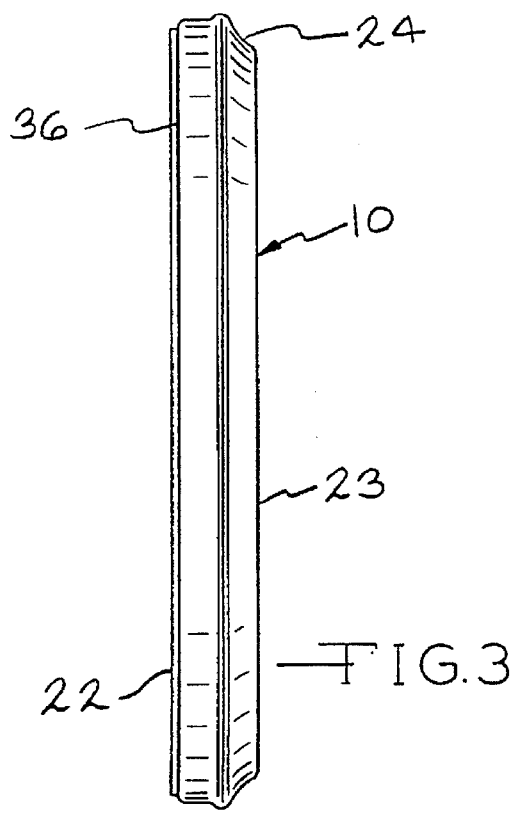
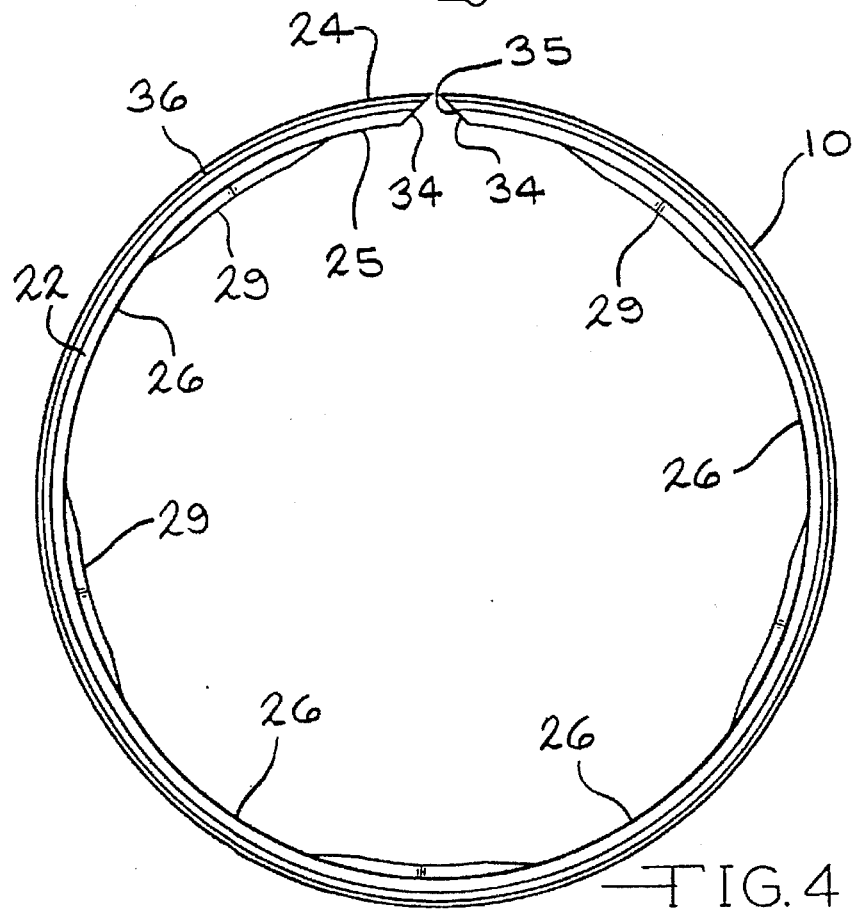

WHEEL ASSEMBLY AND ELASTOMERIC GUARD MEMBER

This is a continuation-in-part of co-pending application Ser. No. 29/045,451, filed Oct. 19, 1995.

FIELD OF THE INVENTION

This invention relates to vehicle wheel assemblies and more particularly to an elastomeric insert or elastomeric guard member for use with a vehicle wheel.

BACKGROUND OF THE INVENTION

Vehicle wheels are well known in the art. Examples of prior art full face wheels are disclosed, for examples, in U.S. Pat. Nos. 4,976,497 and 5,128,085.

The vehicle wheels can be prior art wheels such as full face wheels which often include stylized features such as wheel discs having openings. When vehicle wheels having openings in the wheel disc are utilized, it is not unusual to have water, mud and other debris enter the openings. The water and debris is often thrown outwardly into a space defined between the wheel disc and the wheel rim.

In prior art wheels the dirt and debris could be observed through such openings. This was visually objectionable to many vehicle owners.

SUMMARY OF THE INVENTION

The present invention is directed to an elastomeric wheel insert or wheel guard member which is positioned in the space defined between the rim and the wheel disc of a vehicle wheel. The wheel disc defines a plurality of circumferentially spaced openings. The elastomeric guard member is shaped for positioning within the space defined between the rim and wheel disc. The elastomeric guard member has an outer side for positioning adjacent the rim and an inner side or face for positioning adjacent the outer edges of the spaced openings within the wheel disc. The elastomeric guard member visually blocks the debris from view.

In a preferred embodiment, the elastomeric guard member includes a plurality of circumferentially spaced first portions for positioning adjacent the outer edges of the spaced openings of the wheel disc. The guard member also includes a plurality of second protuberances portions for positioning between adjacent ones of the spaced openings. If the openings are outboard of the rim drop well, the second protuberances portions of the guard member have a thickness greater than the thickness of the spaced first portion. The greater thickness retards the ponding or build up of water against the inner surface of the wheel between the adjacent spaced openings.

BRIEF DESCRIPTIONS OF THE DRAWINGS

FIG. 3 is an edge view of an elastomeric guard member, according to the present invention;

FIG. 4 is an elevational view of the outboard side of the elastomeric guard member shown in FIG. 3;

DESCRIPTION OF THE PREFERRED EMBODIMENT

Referring to FIG. 4, a wheel insert or elastic guard member, according to the present invention is generally indicated by the reference number 10. The elastomeric guard member 10 may be constructed of numerous types of elastomeric materials, however, the preferred material is a urethane material.

The urethane material can be a foamed material or a cast material. Rubber compositions can be used as well as other plastics including closed cell polypropylene and polyethylene materials.

Figure 1:
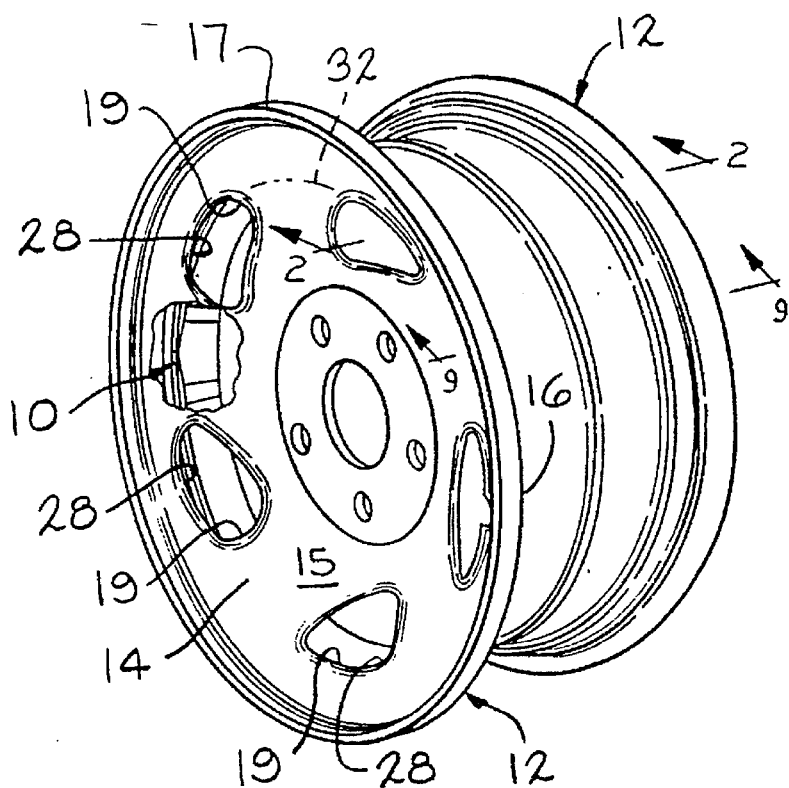
FIG. 1 is a perspective view of a vehicle wheel assembly, according to the present invention.
Figure 2:
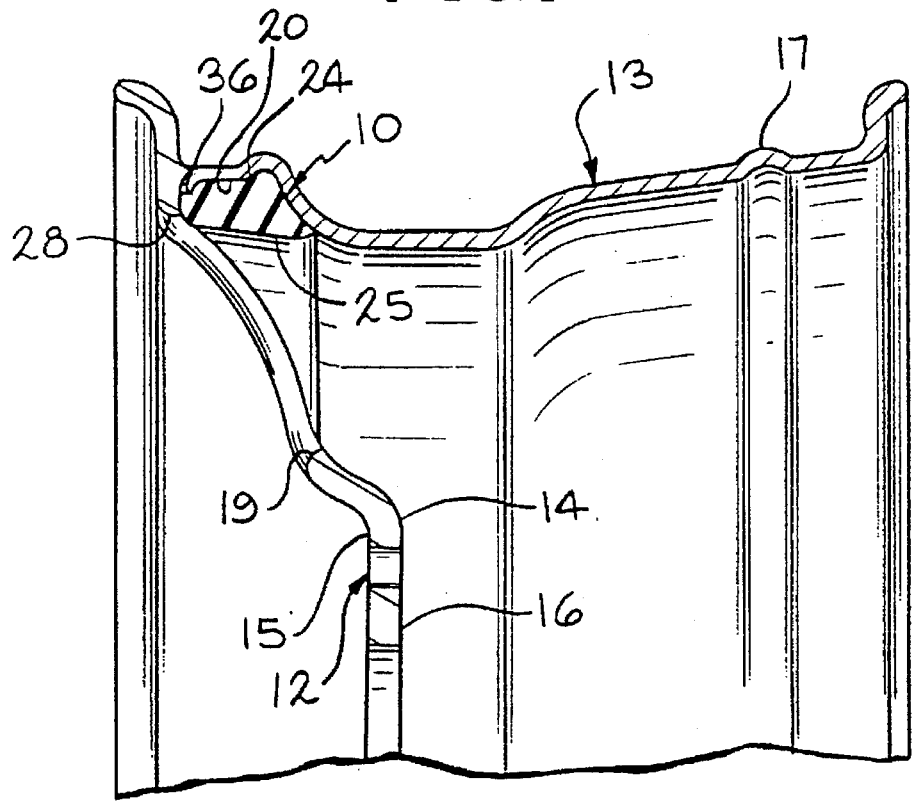
FIG. 2 is a fragmentary, enlarged sectional view of the wheel assembly, taken along the line 2—2 of FIG. 1.
Figure 9:
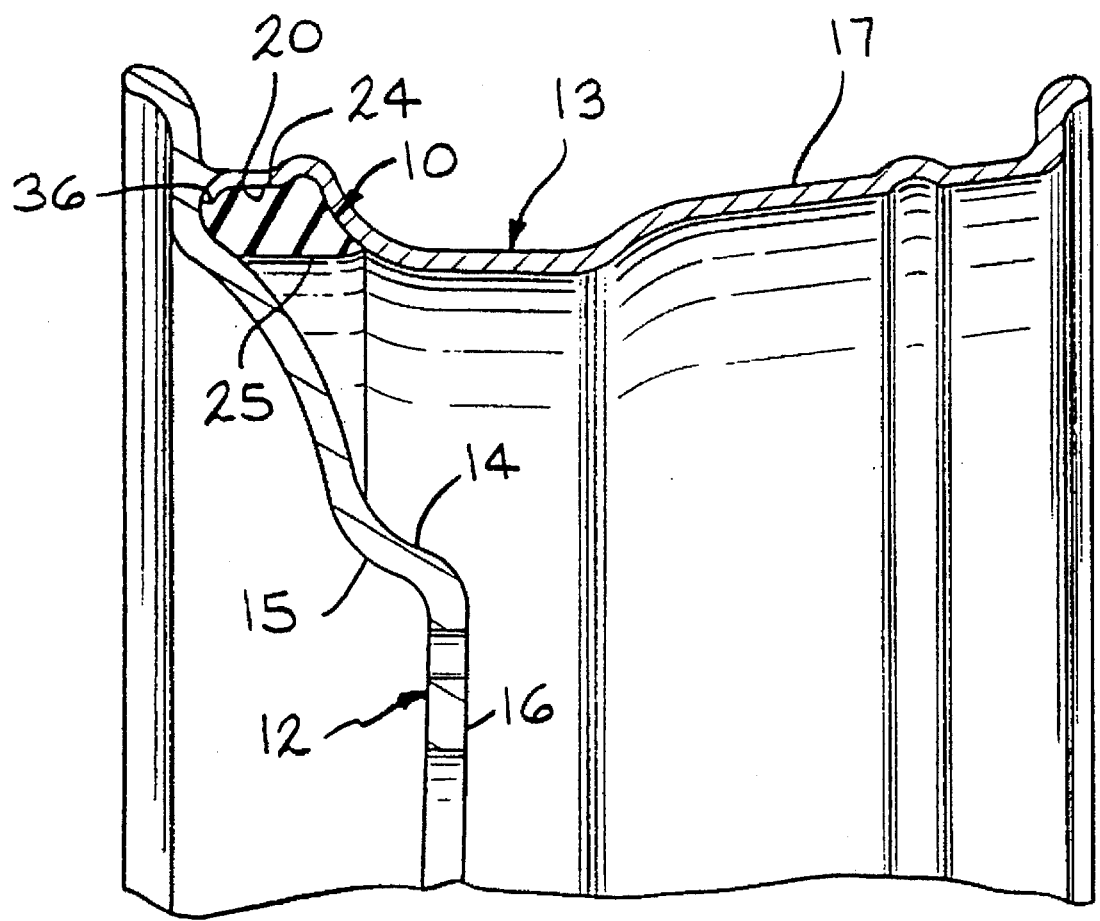
FIG. 9 is a fragmentary cross-sectional view taken along the line 9—9 of FIG. 1 and shown on an enlarged scale.

Referring to FIGS. 1, 2 and 9, a vehicle wheel assembly, according to the present invention, is generally indicated by the reference number 12. The wheel assembly 12 is comprised of a prior art metal vehicle wheel 13 and the elastomeric guard member 10. The vehicle wheel 13 is a full faced wheel and includes a wheel disc 14 having an outboard surface 15 and an inboard surface 16. In the present embodiment the vehicle wheel 13 is a steel or aluminum wheel. A circular rim 17 is connected to the wheel disc 14.

Referring to FIG. 1, a plurality of circumferentially spaced openings 19 are defined by the wheel disc 14. The openings 19 are decorative in nature. However, the openings 19 also provide the function of dissipating heat, for example, from the brake assembly.

Figure 8:
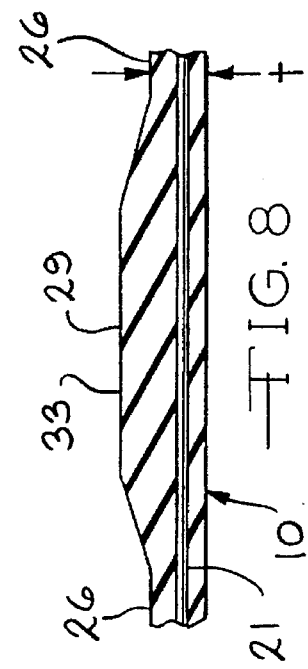
FIG. 8 is an enlarged fragmentary cross-sectional view taken along the line 8—8 of FIG. 7.

The rim 17 and the inboard surface 16 of the wheel disc 14 define a circular space 20 adjacent the openings 19. The elastomeric guard member 10 is positioned within the space 20 adjacent the inboard surface 16 of the wheel disc 14. While the elastomeric guard member 10 is normally retained in the circular space 20 by a compression fit, in other embodiments, the guard member 10 may be attached to the rim 17 by an adhesive. Referring to FIG. 8, when a friction or compression fit is used, it is sometimes desirable to provide a rod 21 which is embedded within the elastomeric guard member 10 and urges the guard member 10 outwardly, thereby aiding the retention of the guard member 10 in the space 20. The rod 21 is preferably constructed of a spring steel, however, other metals and plastic materials can also be utilized.

When prior art vehicle wheels 13 were utilized without an elastomeric guard member 10, the circular space 20 tended to collect water, mud and other debris through the openings 19. This presented an undesirable visual effect.

Placing of the elastomeric guard member 10, according to the present invention, within the circular space 20 gives a superior visual effect. The elastomeric guard member 10 has an outboard side 22 and an inboard side 23. The elastomeric guard member 10 also includes a outer side 24 which is positioned adjacent the circular rim 17 and an inner side 25. The inner side 25 includes a plurality of circumferentially spaced first portions 26 for positioning adjacent outer edges 28 of the openings 19. The inner side 25 of the guard member 10 also includes a plurality of second protuberance portions 29 which alternate with the first portions 26. If the openings 19 are outboard of the rim drop well, the second protuberance portions 29 have a thickness or depth greater than the thickness or depth of the first portions 26.

Referring to FIG. 1, an imaginary concentric line 32 is spaced radially inwardly from the circular rim 17. The concentric line 32 is defined by the outer edges 28 of the openings 19.

Referring to FIG. 8, the first portions 26 of the elastic guard member 10 have a thickness "t" which places the surface of the first portions 26 beneath and adjacent the concentric line 32 and the outer edges 28 of the openings 19. If the openings 19 are outboard of the rim drop well, the second protuberance portions 29 have a thickness greater than the thickness "t" of the first portions 26. In the preferred embodiment, the thickness or depth of the second protuberance portions 29 is at least 1.2 t. The second protuberance portions 29 have an inner surface 33 which is spaced inwardly from the concentric line 32 defined by the outer edges 28 of the openings 19. The second protuberance portions 29 are positioned between adjacent ones of the openings 19 and act as dams to retard the ponding of water or water-debris mixtures against the inboard surface 16, between the spaced openings 19.

Figure 5:
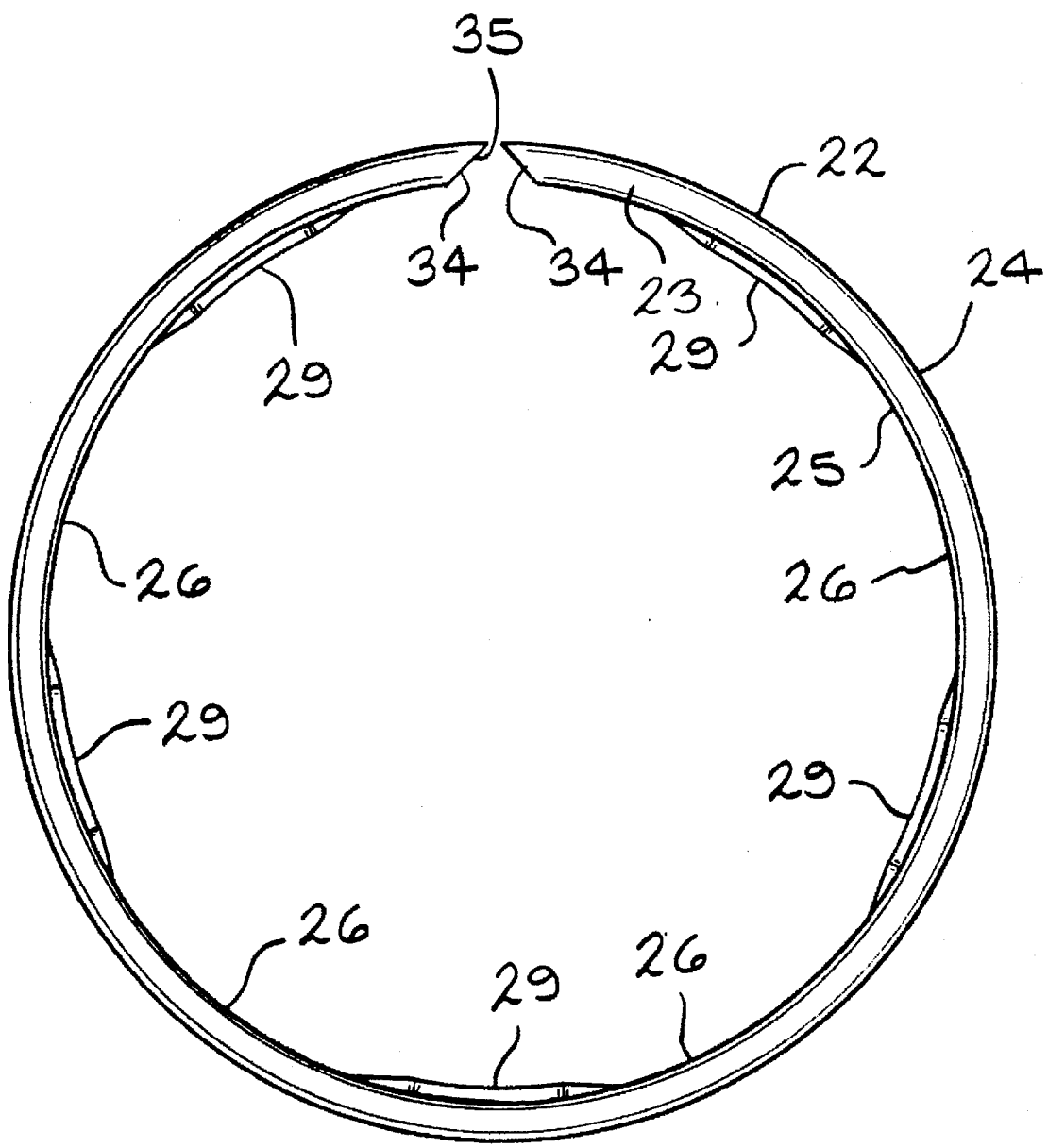
FIG. 5 is an elevational view, similar to FIG. 4, of the inboard side of the elastomeric guard member.
Figure 6:
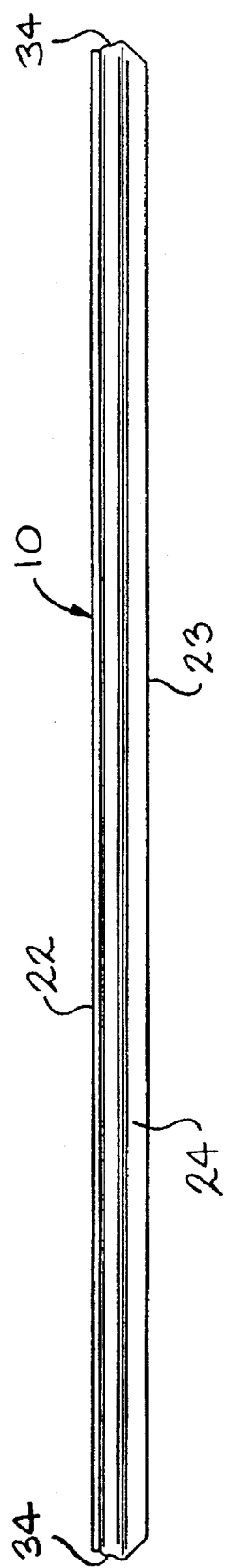
FIG. 6 is an elevational view of the outer side of the elastomeric guard member positioned longitudinally.
Figure 7:
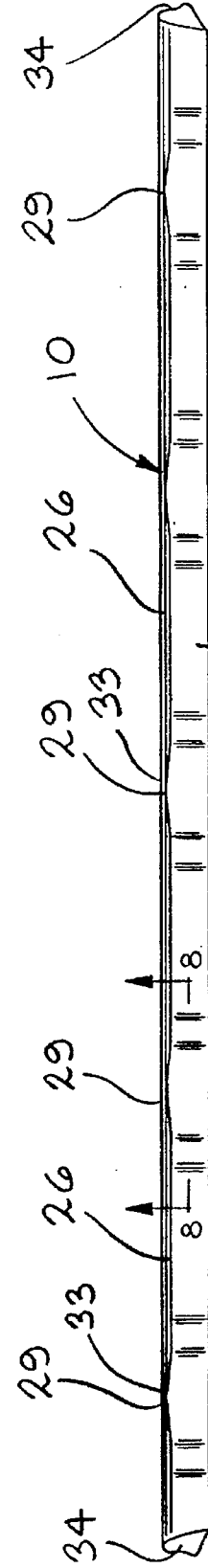
FIG. 7 is a view similar to FIG. 6 showing the inner side of the elastomeric guard member.

In the present embodiment, referring to FIG. 5, the elastomeric guard member 10 includes beveled or inclined ends 34 which define a valve stem opening 35. The elastomeric guard member 10, shown in the present embodiment, is preferably discontinuous. In other embodiments (not shown) the elastomeric guard member 10 is a continuous circular member.

The outboard side 22 and the outer side 24 of the elastomeric guard member 10 are designed to mate with the inboard surface 16 of the wheel disc and also with the circular rim 17. In the present embodiment, the elastic guard member 10 includes a circular recess 36 which mates with the surfaces of the rim 17.

It has been found that the elastomeric guard member 10 provides an overall vehicle wheel assembly 12 which has a good appearance and also retards unwanted collections of water and debris.

Many revisions may be made to the above described embodiments without departing from the scope of the present invention or from the following claims.

We claim:

1. A vehicle wheel assembly, comprising a wheel having a wheel disc and a circular rim connected to said wheel disc for mounting a tire, said wheel disc defining a plurality of circumferentially spaced openings having outer edges, said wheel disc having an outboard surface and an inboard surface, said rim and said inboard surface of said wheel disc defining a circular space adjacent said openings and an elastomeric guard member positioned within said space adjacent said inboard surface, said outer edges of said openings adjacent said rim defining a concentric line spaced radially inward from said circular rim, said elastomeric guard member having an outer side adjacent said rim and an inner side, said inner side having a plurality of circumferentially spaced first portions adjacent the outer edges of said openings and a plurality of second protuberance portions, positioned between adjacent openings, said second protuberance portions having an inner surface spaced inwardly from said concentric line defined by the outer edges of said openings, whereby said second protuberance portions act as dams to retard the ponding of water between said spaced openings.

2. A vehicle wheel assembly, according to claim 1, including a rod within said elastomeric guard member, for urging said guard member radially outwardly.

3. A vehicle wheel assembly according to claim 1, wherein said elastomeric guard member is a urethane guard member.

4. A vehicle wheel assembly, according to claim 3, wherein said elastomeric guard member defines a valve stem opening.

5. A vehicle wheel assembly, according to claim 1, wherein each of said first portions having a thickness t adjacent said inboard surface and each of said second protuberance portions has a thickness of at least 1.2 t.

6. A vehicle wheel assembly, comprising a wheel having a wheel disc and a circular rim connected to said wheel disc for mounting a tire, said wheel disc defining a plurality of circumferentially spaced openings, said wheel disc having an outboard surface and an inboard surface, said rim and said inboard surface defining a circular space adjacent said openings and an elastomeric guard member positioned within said space adjacent said inner surface, said elastomeric guard member having an outer side adjacent said rim and an inner side, a plurality of circumferentially spaced first portions positioned adjacent the outer edges of said spaced openings, a rod positioned within said elastomeric guard member and a plurality of second protuberance portions of a predetermined thickness positioned between adjacent ones of said spaced openings, wherein said second protuberance portions act as dams to retard ponding of water and debris between said spaced openings of said wheel disc.

7. A vehicle wheel assembly, according to claim 6, wherein said elastomeric guard member is a urethane guard member.

8. An elastomeric guard member for use with a wheel having a wheel disc and a circular rim connected to said wheel disc, said wheel disc defining a plurality of circumferentially spaced openings, said wheel disc having an outboard surface and an inboard surface, said rim and said inboard surface defining a circular space adjacent said spaced openings, said elastomeric guard member being shaped for positioning within said space, said elastomeric guard member having an outer side for positioning adjacent said rim and an inner side having a plurality of circumferentially spaced first portions for positioning adjacent the outer edges of said spaced openings and a plurality of second protuberance portions of a predetermined thickness for positioning between adjacent ones of said spaced openings, said second protuberance portions having a thickness greater than said predetermined thickness, wherein said second protuberance portions act as dams to retard the ponding of water and debris between said spaced openings of said wheel disc.

9. An elastomeric guard member, according to claim 8, wherein said elastomeric guard member is constructed of urethane.

10. An elastomeric guard member, according to claim 8, including a biasing rod embedded within said elastomeric guard member.

* * * * *